UNITED STATES PATENT OFFICE.

JOHN H. CORNELL, OF BROOKLYN, NEW YORK, (ADMINISTRATOR OF JOHN CORNELL, DECEASED,) ASSIGNOR TO CHARLES NOBLE.

IMPROVED ARTIFICIAL FUEL.

Specification forming part of Letters Patent No. 44,994, dated November 8, 1864.

*To all whom it may concern:*

Be it known that JOHN CORNELL, deceased, and late of the city, county, and State of New York, did invent a new and Improved Artificial Fuel; and we hereby declare that the following is a full, clear, and exact description of the same.

The nature of this invention consists in producing an article of fuel from the dust or waste of anthracite, bituminous, and other coals by first saturating the same with a solution of dextrine or starch derived from wheat, corn, rye, potatoes, rice, or other organic starch-containing bodies, and when of the proper consistency pressing or otherwise forming the same into blocks or lumps of any convenient size or shape for use as fuel, and subsequently drying these blocks or lumps in the sun, or in any other suitable manner.

The article thus produced, besides being much cheaper than any artificial fuel, can be made from an admixture of flour and coal-dust, gives off no disagreeable odor in burning, neither is it liable to crack, as is the case with artificial fuels in which flour forms one of the ingredients of the compound.

Having thus described the invention of the said JOHN CORNELL, what we claim as new, and desire to secure by Letters Patent, is—

Producing fuel by incorporating the dust or waste of anthracite, bituminous, and other coals with a solution of dextrine or starch, and pressing or otherwise forming the composition into lumps or blocks, which are subsequently dried, all as herein set forth.

CH. NOBLE,
J. H. CORNELL,
*Administrators of John Cornell, deceased.*

Witnesses:
GUSTAVE MILLER,
CHAS. E. PATTERSON.